Patented Apr. 23, 1940

2,198,380

UNITED STATES PATENT OFFICE 2,198,380

CARBONIZED TANNIN MATERIAL FOR WATER SOFTENING AND PROCESS OF MAKING SAME

Carleton Ellis, Montclair, N. J., assignor to Ellis-Foster Company, a corporation of New Jersey No Drawing. Application January 5, 1937, Serial No. 119,131

12 Claims. (Cl. 252—2)

This invention relates to organic base-exchange material, useful in the art of water purification and water softening, made by treating certain kinds of vegetable matter with an acid capable of causing extensive condensation and dehydration to the point of incipient carbonization.

The invention relates particularly to certain types of wood and woody materials including natural and artificial derivatives of plant life, and particularly such wood and bark as contain relatively large amounts of tannins. Thus I include in this heading such materials as sawdust, wood, bark, lignin, and certain natural resins.

As a special phase of the invention I preferably use extracts rich in vegetable tannins and other wood extracts, which contain considerable proportions of tannins.

Acids which are capable of instilling base-exchange properties in these materials include sulphuric acid, oleum, sulphonic acids, phosphoric acid, phosphoric anhydride, fluosilicic acid, and their chemical equivalents and mixtures of these. "Acid sludge" from petroleum refining is included here, this being very cheap. The reagents should possess suitably strong acidic and dehydrating properties.

The exact nature of the reactions ensuing when the vegetable matter is treated with the acid in accordance with the present invention is not definitely known. Depending on the temperature and concentration, a certain amount of dehydration occurs with spontaneous evolution of heat and corresponding rise in temperature. It is probable that oxidation, addition of acid groups to the molecule, and polymerization processes also occur. Usually the color of the material darkens as incipient carbonization progresses and may assume a dark gray or black appearance. The time, temperature, and concentrations should be so adjusted that the final product is substantially at the point of incipient carbonization, and indeed, for practical purposes, a small amount of actual carbonization is desirable.

The substances made according to the process involved herein are most suitable as base-exchange materials in the art of water softening. The term "water softening" I preferably use to designate the removal of calcium, magnesium, and other hardness-producing cations occurring in natural waters which cause precipitation of insoluble soaps when used in laundering and for various domestic purposes. The term "water purification" as used herein, embraces water softening and also includes the removal of any ion regarded as obnoxious under given conditions. The herein described materials are adaptable to use for removal of a wide variety of cations. For example, water which has passed through lead pipes sometimes contains sufficient dissolved metal to render the water too toxic for human consumption. By passing such a water through certain of my base-exchange materials as produced under present invention, the lead is absorbed and the treated water will have been purified. Further, in industries where valuable metals are lost or thrown away in the waste water (e. g., spent plating baths), they may be recovered by filtering the water through the acid treated vegetable matter.

Although zeolites have been used as base-exchange materials for a long period, it is only recently that substances of organic origin have been suggested for similar purposes. Thus, Adams and Holmes (J. S. C. I., 1935, 54, 1–6) report that resins formed by condensing polyphenols with formaldehyde are useful in this connection. By my method, although more drastic treatment of raw materials is effected, the resultant products possess a base-exchange capacity considerably greater than those produced by mere resinification with aldehydes.

The treated water from a zeolite (so called "sodium alumino silicate") softening process contains sodium ions which have replaced the calcium and magnesium in the original waters. For certain industries which require water free from all meals the zeolite process cannot be used. By regenerating the products of the present invention with dilute acid instead of sodium chloride brine, a treated water will contain hydrogen ions instead of metallic ions; this cannot be done with zeolites because of the disintegrating action thereon of waters of low (that is, acid) pH. Inasmuch as my materials can be made by treating with concentrated strong acids, further exposure to dilute acids has no such deleterious effect. Further, it has been established that even slight acidity, such as a pH of 4 to 6, although not especially harmful, nevertheless reduces the base-exchange capacity of zeolites considerably. (Behrman & Gustafson, Ind. Eng. Chem., 1936, 28, 1279.) Waters of reasonable acidity have substantially no effect on the present materials.

In carrying out the invention, I may take some form of vegetable matter preferably containing some moisture and containing a notable amount of tannins such as sawdust, redwood bark, or redwood flour, or preferably extracts rich in tannins, e. g., quebracho tannin, chestnut extract, hemlock, gambier, hematine, sumac, fustic, or cutch or tannic acid itself, and add it with stirring to from 2 to 10 times its weight of an acid such as concentrated sulphuric acid (specific gravity 1.83), concentrated phosphoric acid, sulphonic acids in the form of sludge from petroleum refining processes, or fluosilicic acid. Depending on the specific materials used, the temperature, concentrations, and degree of moisture present, a reaction takes place which may liberate a sufficient amount of heat to cause a sharp rise in temperature. Constant agitation and a sufficiently large vessel to hold the foam produced are recommended. If it is desired to moderate the reaction, either dilution or artificial cooling may be resorted to. When concentrated sulphuric acid is used on small batches the temperature seldom rises above 80°–90° C. Nevertheless, with large batches where insufficient natural radiation of heat occurs from the walls of the apparatus, the temperature may greatly exceed this, and cooling may be necessary. It is essential that the reaction be carried sufficiently far so that ultimate carbonization is approached but it is likewise important to halft the process before the material is reduced wholly to a carbonaceous mass. The above mentioned organic materials are all well known to contain relatively large amounts of tannins. They all contain, in fact, more than 7% of tannins, and the extracts contain tannin in amount several times more than 7%. Analysis of various organic materials, showing the amount of tannins therein, will be found in "Chemical Dictionary" by Hackh, 2nd edition, 1937, page 914, et seq.

An advantage of using the above type of caid reagent is that ordinarily heating need not be augmented by artificial means. Even with phosphoric acid (e. g., 80% strength), although the temperature reached seldom exceeds 30°–40° C., the action may be allowed to find its own thermal equilibrium over a period of 18 to 24 hours to yield a product having good base-exchange properties. With fluosilicic acid, however, a gentle warming to about 50° C. or higher is advisable to expedite the conversion.

It should not be construed that application of heat is always not necessary with acids of the sulphuric type, for in certain cases this may prove advantageous. The amount of heat generated by, say sulphuric acid depends partially on the exothermic nature of the reaction, further on the degree of dehydration, and also on the heat of dilution of acid by physically and chemically retained moisture of the vegetable matter. In an especially dry raw material it is convenient either to add a small amount of water, or, if it be desired on the other hand to maintain a high concentration of acid, external heat may be supplied.

The mixture of tannin-containing material and, e. g., sulphuric acid, then, ordinarily results in a rise in temperature. I prefer to keep this temperature within the limits of about 50° to 150° C., and a desirable mean temperature is 75° C. Any of the methods such as artificial cooling or heating, dilution by or removal of water or other appropriate solvent, or choice of reagents or raw materials may be utilized to this end.

Although I do not wish to be limited by the theory, it is probable that of the complex reactions taking place those unit processes comprising dehydration, polymerization and possible addition of acidic groups are important. It may well be that the molecules of organic substances are polymerized by condensation with elimination of water, the extreme violence of treatment with strong acids serving to form substances of unusually high carbon content. The multi-atomic carbon structures may have several acidic groups attached which assist the activity of the product. Yet it is necessary to carry the reaction to the point of incipient carbonization in order to establish an adequate degree of insolubility in water. What I mean by "incipient carbonization" is that the condensation is carried to such a stage that the molecular structure of the substance is sufficiently of the carbon type chemically combined with relatively few dissimilar atoms but yet not far enough so that completely amorphous carbon is obtained. It is desirable to stop the reaction at this stage, but for practical purposes the time and other conditions of reaction are so controlled that a certain amount of carbon having an auxiliary or supplemental degree of activity forms. Since sulphonation for example is a well known method of rendering organic materials water-soluble, I regard my invention as new and novel in that I have procured an insoluble substance which is useful because it is reactive with bases and exhibits base-exchange characteristics.

When I have the acid-treated vegetable matter at the optimum stage, I stop the reaction by cooling and conveniently by pouring the charge into a relatively large volume of water, this also serving to wash the product at least partially free of excess acid. The solid particles are separated by a suitable means such as filtration or decantation, and further washed if desired. Although the material may be used while still wet but washed substantially free of acid, I prefer to dry it, as this serves to improve the granule characteristics such as porosity and crushing strength. The solid reaction product is often of a variety of particle sizes. It may be crushed or ground and classified by screening, and this may take place before washing so that the latter process is facilitated; but screening may usually be accomplished more successfully after drying.

Having then the washed, dried, and screened material, it may be used at once if desired. I prefer, however, to augment the base-exchange properties by a tuning-up step or activation-enhancement involving several cycles of exhaustion and regeneration, after which the products exhibit base-exchange properties to a more marked degree. This may be accomplished by loading a water-softening device (or simply a container which will allow water to pass through its bottom) and allowing a water which contains considerable amounts of a cation, for example calcium, to percolate through the mass undergoing a stimulation of activation. After the material is thoroughly exhausted it may be regenerated with a suitable solution, for instance dilute acid or a sodium chloride brine. Another method is to place the acid-treated substance in a container and digest it, possibly with occasional agitation, in a cation-containing solution, decanting, and further digesting in a regenerating solution. The cycle of exhaustion and regeneration is repeated a sufficient number of times until the magnitude of increase in base-exchange capacity will not warrant further treatment.

The number of activating cycles may be reduced by increasing the concentration of exhausting and regenerating solutions, whereby the effect is intensified. Care should be taken, however, not to use such concentrated solutions as will cause disintegration.

A suitable method of use for water treatment is to place the mass in an apparatus which will permit the water to run through either by gravity or under pressure. The water to be treated is then led through the apparatus and the base-exchange material removes the undesirable cation. As concrete examples, hard water, i. e., water containing calcium and magnesium ions, when conducted through the product of this invention, has its hardness removed, whereupon the cations are replaced with sodium or hydrogen according to whether the material is regenerated with brine or acid. Water containing dissolved lead may have the lead extracted by this treatment and regeneration may be accomplished with acetic acid. After the material has reached its lead saturation point, it may be regenerated by passing a suitable solution (e. g., dilute acetic acid), through the apparatus.

The following examples are illustrative of the invention and should not be construed to limit the invention as to scope or proportion.

*Example 1.*—One hundred parts of chestnut extract (powder) were stirred into 300 parts of concentrated sulphuric acid. The material became black and an exothermic reaction occurred, taking the temperature to 80° C. After standing ½ hour or so to cause incipient carbonization in sufficient degree, it was poured into a large volume of water, and the precipitate filtered off, washed, and dried at 50° C. The hard lumps were ground and screened to pass through 20 over 40 mesh. The classified material was further washed by decantation to eliminate semi-colloidal fines and then placed in a glass tube 2 cm. in diameter to form a column 10 cm. high. Distilled water was percolated through the material until the washings were free from acid. The base-exchange material was then ready to use.

A solution of calcium sulphate containing 407 ppm. hardness (as calcium carbonate) was passed through the column, each 50 cc. portion of effluent being titrated with standard soap solution to determine hardness. A total of 450 cc. were softened. The column was regenerated by allowing 200 cc. of 10% sodium chloride to drip through, followed by distilled water until the washings were free of chloride. When tested again with the calcium sulphate solution, 600 cc. of the hard water were softened. After another regeneration cycle with sodium chloride, over 650 cc. were softened. A third regeneration cycle allowed the calcium to be extracted from 1000 cc. of the water. After a fourth regeneration, 1200 cc. were softened.

The column was again treated with sodium chloride and then tested with a solution of lead acetate (2 g. per liter), 150 cc. passing through without the effluent showing any lead ions. The material, i. e., the water-softening material, was not saturated with lead, however. One hundred and fifty cc. of a solution containing 1 g. of gold chloride per liter were not passed through and no gold was found in the effluent.

*Example 2.*—Fifty parts of chestnut extract (powder) were stirred into 200 parts of concentrated sulphuric acid. The material blackened and spontaneously heated to 76° C. Heat was then applied, and the temperature was gradually raised to 150° C., stirring the mixture constantly to keep down the foam. After holding the temperature at 150° C. for 3 minutes the entire mass set to a tough gel which hardened on cooling. It was crushed, screened and washed, and tested as in Example 1. A total of 500 cc. of a calcium sulphate solution containing 456 ppm. (as calcium carbonate) were softened by the column. The amount softened remained the same after regeneration with 200 cc. of 10% sodium chloride.

*Example 3.*—Three hundred parts of concentrated sulphuric acid were chilled to −15° C. and 50 parts of powdered chestnut extract were slowly added, the temperature rising to −5° C. The mix was allowed to stand one hour at −10° C. and then poured into five times its volume of cracked ice. On filtering the solution, only a negligible amount of precipitate was separated, substantially all of the material having been water soluble. Here the temperature was too low to give useful results.

The test was therefore repeated, cooling 500 parts of concentrated sulphuric acid to 10° C., and adding 100 parts of the powdered chestnut extract. The temperature was kept at 15° C. for 15 minutes and then removed from the cooling bath and allowed to stand for 1 hour, when the temperature had increased to 25° C. The reaction mixture was poured into a large volume of water, filtered, and dried.

It was tested as in Example 1, using calcium sulphate solution of 478 ppm. hardness. Only 200 cc. of the water were softened. The column was regenerated with 200 cc. of 10% sodium chloride brine, and tested again, when 300 cc. of the hard water were softened. Here the temperature was too low to give a satisfactory result. As stated above, a minimum temperature of 65° C. is preferable.

*Example 4.*—The procedure was repeated using 100 parts of powdered chestnut extract which lost 8% of its weight (moisture) on heating at 100° C. for 16 hours, and 400 parts of concentrated sulphuric acid. The maximum spontaneous temperature reached was 65° C. The first trial showed 250 cc. of water containing 478 ppm. hardness had been softened. The column was regenerated with 200 cc. of 10% sodium chloride solution. It then softened 350 cc. of water containing 385 ppm. hardness.

*Example 5.*—Example 1 was repeated using 50 parts of sawdust and 300 parts of sulphuric acid. A 10 cm. x 2 cm. column softened 50 cc. of calcium sulphate solution containing 456 ppm. hardness (as calcium carbonate) on the first trial. After regeneration with 200 cc. of 10% sodium chloride brine, two successive trials showed 400 cc. and 350 cc. softened, respectively. This material appears not very satisfactory for the purpose, being of too low activity.

*Example 6.*—Fifty parts of finely-divided redwood (flour) were stirred into 400 parts of concentrated sulphuric acid. The mixture became a thick gummy mass which was dumped into a large volume of water, washed, filtered, dried, and screened through 20 over 40 mesh. The material was placed in a glass tube 2 cm. in diameter to form a column 10 cm. high. On passing a calcium sulphate solution (456 ppm. hardness) through the column only 50 cc. were softened. The base-exchange material was treated with 200 cc. of 5% calcium chloride and then digested in 400 cc. of 10% sodium chloride solution. It was repacked in the glass tube, washed free of chloride, and tested again with the calcium sulphate solution. Three hundred and fifty cc. were softened.

*Example 7.*—Example 6 was repeated using

80% ortho-phosphoric acid instead of sulphuric acid. The material was dark brown colored instead of black. When tested as in Example 6, 500 cc. of calcium sulphate solution (containing 456 ppm. hardness as calcium carbonate) were passed through before calcium ions were found in the effluent. After regeneration with 200 cc. of 10% sodium chloride brine, 650 cc. of water containing 435 ppm. hardness were softened.

*Example 8.*—Fifty parts of quebracho extract were stirred into 200 parts of 80% ortho-phosphoric acid and allowed to stand 18 hours. The mixture was poured into a large volume of water where a slight precipitate appeared, most of the material being water soluble. The precipitate was filtered off, washed, dried, and screened through 20 on 40 mesh. It was placed in a glass tube 2 cm. in diameter to form a column 5 cm. high. A solution of calcium sulphate (456 ppm. hardness as calcium carbonate) was dripped through and 300 cc. of the water were softened. After regeneration with 200 cc. of 10% sodium chloride brine, 500 cc. of water containing 435 ppm. hardness were softened.

*Example 9.*—The procedure of Example 1 was repeated using quebracho extract (powder) in place of the chestnut extract. The "sulphated" material had the same appearance of incipient carbonization as that of Example 1.

The following table shows the cubic centimeters of calcium sulphate solution of 400 ppm. hardness (as calcium carbonate) softened per cycle, the column being regenerated with 200 cc. of 10% sodium chloride brine between each trial:

| Test | Cubic centimeters of water softened |
| --- | --- |
| 1 | 200 |
| 2 | 1,300 |
| 3 | 1,650 |
| 4 | 1,650 |

*Example 10.*—Example 1 was repeated using 100 parts of ground cutch instead of the chestnut extract. The first trial with water of 407 ppm. hardness showed 850 cc. softened. The base-exchange material was digested in 400 cc. of 5% calcium chloride solution, washed slightly by decantation, then digested further in 400 cc. of 10% sodium chloride brine. The material was returned to the glass tube and washed with distilled water until free from chlorides. A total of 750 cc. of water (400 ppm. hard) was softened. The column was regenerated with 200 cc. of 5% hydrochloric acid and washed free of excess acid. This time 1000 cc. of water (400 ppm.) were softened, an equivalent amount of acid being found in the effluent.

*Example 11.*—One hundred parts of chestnut extract were mixed with 300 parts of "acid sludge" or water soluble sulphonic acids from a white oil treating plant in a petroleum refinery, and slowly heated to 150° C. with stirring. The mixture gradually became more viscous and finally resembled a granular solid. This was washed with a large volume of water, dried and tested as in the preceding examples. A total of 750 cc. of water containing 478 ppm. hardness were softened. After regenerating with 10% sodium chloride brine, the same amount of this hard water was softened.

*Example 12.*—Two hundred parts of fluosilicic acid and 50 parts of chestnut extract were boiled under reflux for 20 minutes. The reaction mixture was allowed to cool slightly and was diluted with a large volume of water, filtered, and dried. The product was tested as in Example 1, but no water was softened. After regeneration with 10% sodium chloride, the material removed the calcium from 100 cc. of water containing 385 ppm. hardness.

Most of the matter of this application is continued from my earlier case 115,813, filed Dec. 14, 1936, in which the process of purifying (softening) water will be included.

What I claim is:

1. Process of making a base-exchange water-softening agent which comprises incorporating with a solid vegetable matter which contains not less than about 7% of tannins, several times its own weight of a concentrated acid selected from the group consisting of sulphuric acid, oleum, acid sludge from petroleum refining, phosphoric, and fluosilicic acids, and phosphoric anhydride, allowing spontaneous heating to progress to a temperature above 50° C. but not exceeding 150° C. and maintaining the temperature within that range for a period of time sufficient to produce incipient carbonization, whereby a base-exchange material is obtained and washing out water-soluble components.

2. Process of making a base-exchange water-softening agent which comprises incorporating with a solid vegetable matter containing not less than about 7% of tannin, several times its own weight of a concentrated mineral acid of the type selected from the group consisting of sulphuric, oleum, phosphoric, fluosilicic acids, acid sludge from petroleum refining, and phosphoric anhydride, allowing spontaneous heating to progress to a temperature above 50° C. but not above 150° C., and maintaining the temperature within that range until incipient carbonization results.

3. Process of making a base-exchange water-softening agent which comprises incorporating a vegetable tanning extract containing substantially over 7% of tannin, with several times its own weight of a concentrated strong acid selected from the group consisting of sulphuric acid, oleum, phosphoric acid, phosphoric anhydride, acid sludge from petroleum refining, and fluosilicic acid, and maintaining the mass at between 50° C. and 150° C. until incipient carbonization of the solid reaction product is effected.

4. Process of making a base-exchange water-softening agent which comprises incorporating with vegetable tanning matter containing substantially over 7% of tannin, several times its own weight of a concentrated sulphuric acid and maintaining the reacting mass at about 75° C. until incipient carbonization results.

5. A process according to claim 2, in which said vegetable matter is acid treated in a somewhat moist state.

6. A water softening material which is substantially free from water-soluble constituents and which is adapted to remove calcium from water containing the same by base-exchange with a more innocuous cation, which comprises a product which is substantially devoid of water-soluble matter, and is identical with the product produced by reacting upon a substantially solid tannin material containing at least about 7% of tannins, with several times its own weight of concentrated sulphuric acid, and causing the temperature to rise sufficiently to produce incipient carbonization but not substantially above 150° C., washing the thus treated solid material, drying and granulating the same.

7. A water softening material which is substantially free from water-soluble constituents and which is adapted to remove calcium from water containing the same by base-exchange with a more innocuous cation, which comprises a product which is substantially devoid of water-soluble matter, and is identical with a product produced by reacting a concentrated acid selected from the group consisting of sulphuric acid, oleum, phosphoric acid, phosphoric anhydride, acid sludge from petroleum refining and hydrofluosilicic acid, with a substantially solid tannin material containing not less than 7% of tannin and selected from the class consisting of comminuted wood, comminuted bark, quebracho extract, chestnut extract, gambier, cutch, hematine, sumac, fustic and tannic acid, the amount of such concentrated acid being several times the amount of said tannin-containing material, and causing the temperature to rise sufficiently to produce incipient carbonization but not substantially above 150° C., washing the thus treated solid material, drying and granulating the same.

8. Product according to claim 7, made from quebracho tannin.

9. Product according to claim 7, made from hemlock tannin.

10. A water-softening agent of the base-exchange type which is uninjured by dilute acid solutions and which is substantially devoid of water-soluble components, which comprises a product identical with the product made by treating chestnut extract in powder form with several times its own weight of concentrated sulphuric acid and maintaining a temperature of 50° C. to 150° C. until incipient carbonization and insolubilization has been effected.

11. A base-exchange water-softening agent which is identical with the product made by incorporating with a solid vegetable material which contains not less than 7% of tannins, several times its own weight of a concentrated phosphoric acid, maintaining the temperature of the mixture at between 50° C. and 150° C., for a sufficient time to produce incipient carbonization of such vegetable material, and washing out the soluble acid and other soluble materials.

12. A base-exchange water-softening agent which is identical with the product made by incorporating with a solid vegetable material which contains not less than 7% of tannins, several times its own weight of acid sludge from petroleum refining, maintaining the temperature of the mixture at between 50° C. and 150° C. for a sufficient time to produce incipient carbonization of such vegetable material, and washing out the soluble acid and other soluble materials.

CARLETON ELLIS.